United States Patent
Chen

(10) Patent No.: US 8,052,232 B1
(45) Date of Patent: *Nov. 8, 2011

(54) BIAXIAL FLOW DAMPER FOR DRAWER

(75) Inventor: Yung-Liang Chen, Taipei Hsien (TW)

(73) Assignee: KV IP Holdings Ltd., George Town, Grand Cayman (KY)

( * ) Notice: Subject to any disclaimer, the term of this patent is extended or adjusted under 35 U.S.C. 154(b) by 465 days.

This patent is subject to a terminal disclaimer.

(21) Appl. No.: 12/010,407

(22) Filed: Jan. 24, 2008

Related U.S. Application Data

(63) Continuation-in-part of application No. 11/905,633, filed on Oct. 3, 2007, now Pat. No. 7,784,890.

(51) Int. Cl.
*A47B 95/02* (2006.01)

(52) U.S. Cl. .................... 312/319.1; 312/334.44

(58) Field of Classification Search ............ 312/319.1, 312/333, 334.44, 334.46; 16/285, 286, 54, 16/85; 188/302, 303, 304
See application file for complete search history.

(56) References Cited

U.S. PATENT DOCUMENTS

| | | | | |
|---|---|---|---|---|
| 678,790 | A * | 7/1901 | Nushwag | 16/66 |
| 2,596,676 | A * | 5/1952 | Goderez | 16/52 |
| 3,521,939 | A * | 7/1970 | Vaughn et al. | 312/332.1 |
| 5,201,512 | A * | 4/1993 | Rabin | 271/164 |
| 6,397,430 | B1 * | 6/2002 | Brown et al. | 16/71 |
| 6,837,343 | B1 * | 1/2005 | Bugaj | 188/304 |
| 7,244,005 | B1 * | 7/2007 | Lu | 312/333 |
| 7,784,890 | B1 * | 8/2010 | Chen | 312/319.1 |
| 2006/0278457 | A1 * | 12/2006 | Schwindt | 180/227 |
| 2007/0278919 | A1 * | 12/2007 | Lu | 312/333 |

* cited by examiner

*Primary Examiner* — Darnell Jayne
*Assistant Examiner* — Matthew Ing
(74) *Attorney, Agent, or Firm* — Cook Alex Ltd.

(57) ABSTRACT

A biaxial flow damper used in an auto-close mechanism of a sliding rail assembly is disclosed to include a cylinder body defining flow parallel flow chambers, two pistons respectively slidably mounted in the flow chambers of the cylinder body, and two piston rods respectively connected to the pistons and respectively extending out of the front and rear sides of the cylinder body for a reciprocating motion in reversed directions.

27 Claims, 18 Drawing Sheets

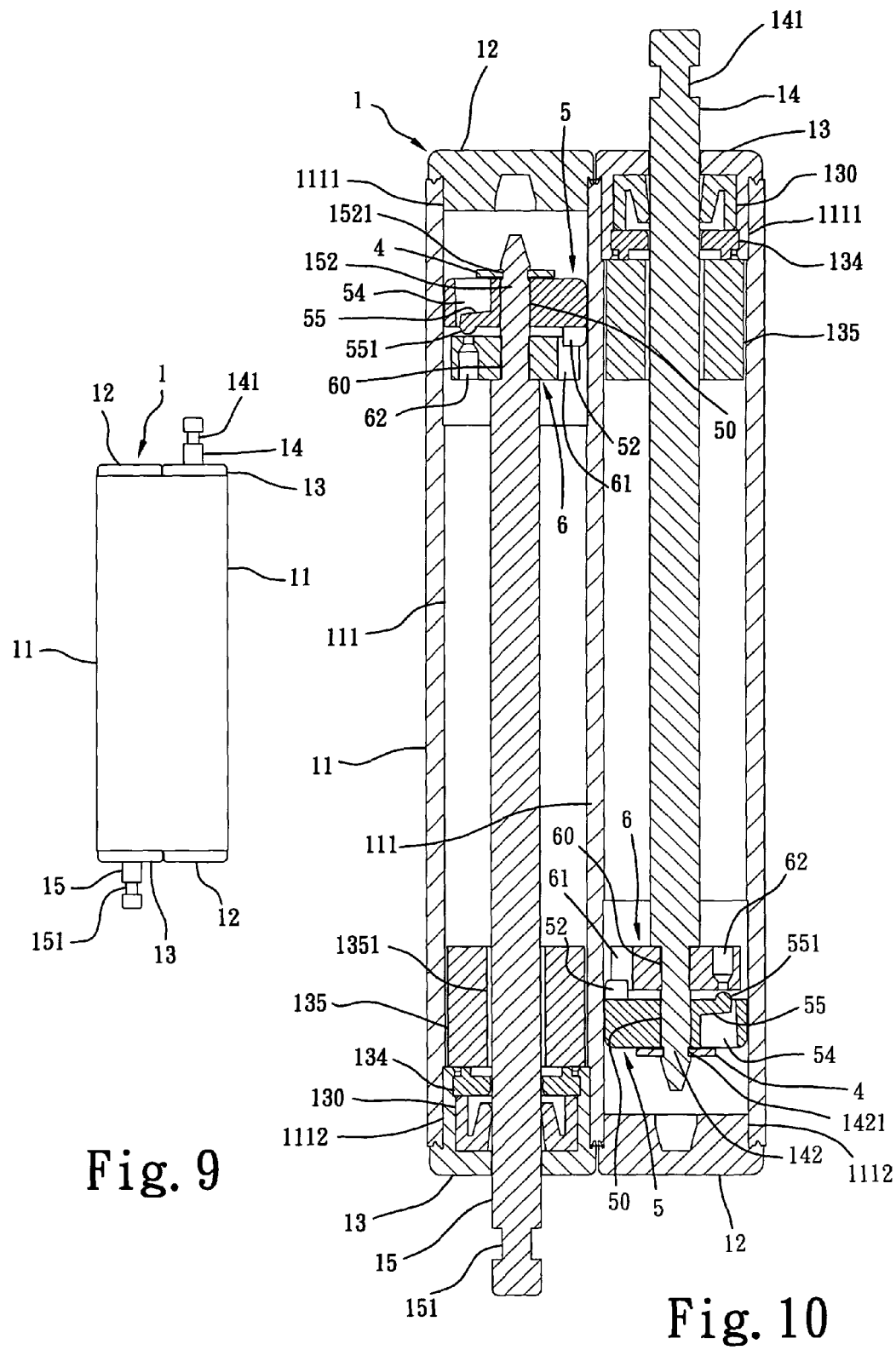

BIAXIAL FLOW DAMPER FOR DRAWER

CROSS-REFERENCE TO RELATED APPLICATION

The invention is a continuation-in-part of U.S. application Ser. No. 11/905,633, filed on Oct. 3, 2007 now U.S. Pat. No. 7,784,890, issued Aug. 31, 2010.

BACKGROUND OF THE INVENTION

1. Field of the Invention

The present invention relates to a damping device for use in an auto-close mechanism of a sliding rail assembly for drawer, sliding door or furniture and more particularly, to a biaxial flow damper for drawer, which uses front and rear pistons in two parallel flow chambers in one cylinder body to provide a relatively greater resistance, enhancing the buffer effect against the movement of the auto-close mechanism, and therefore the auto-close mechanism does not require much installation space while providing a relatively longer buffer stroke to achieve a relatively better buffer performance.

2. Description of the Related Art

Various monoaxial flow dampers (including hydraulic dampers and pneumatic dampers) for use in a drawer, sliding door or any of a variety of furniture are known. Exemplars are seen in U.S. Pat. No. 6,615,450B2, U.S. Pat. No. 7,244,005, and Taiwan Utility M294879. However, these conventional designs are not suitable for the condition where a great buffer effect is required. Extending the stroke of the buffer effect to enhance the damping for application in a condition where a great buffer effect is required will complicate the structure and relatively increase the dimension. Therefore, there is a demand for a damper that eliminates the aforesaid problem.

SUMMARY OF THE INVENTION

The present invention has been accomplished under the circumstances in view. It is one object of the present invention to provide a biaxial flow damper, which uses front and rear pistons in two parallel flow chambers in one cylinder body to produce enhanced flow resistance, thereby providing a better buffer effect.

It is another object of the present invention to provide a biaxial flow damper, which is practical for use in the sliding rail assembly of a drawer, server or the like, which requires less installation space and provides a long buffer stroke to enhance the buffer effect.

BRIEF DESCRIPTION OF THE DRAWING

FIG. 9 is a bottom plain view of a biaxial flow damper according to a first embodiment of the present invention.

FIG. 10 is a longitudinal view in section in an enlarged scale of FIG. 9.

DETAILED DESCRIPTION OF THE INVENTION

Figure 1:
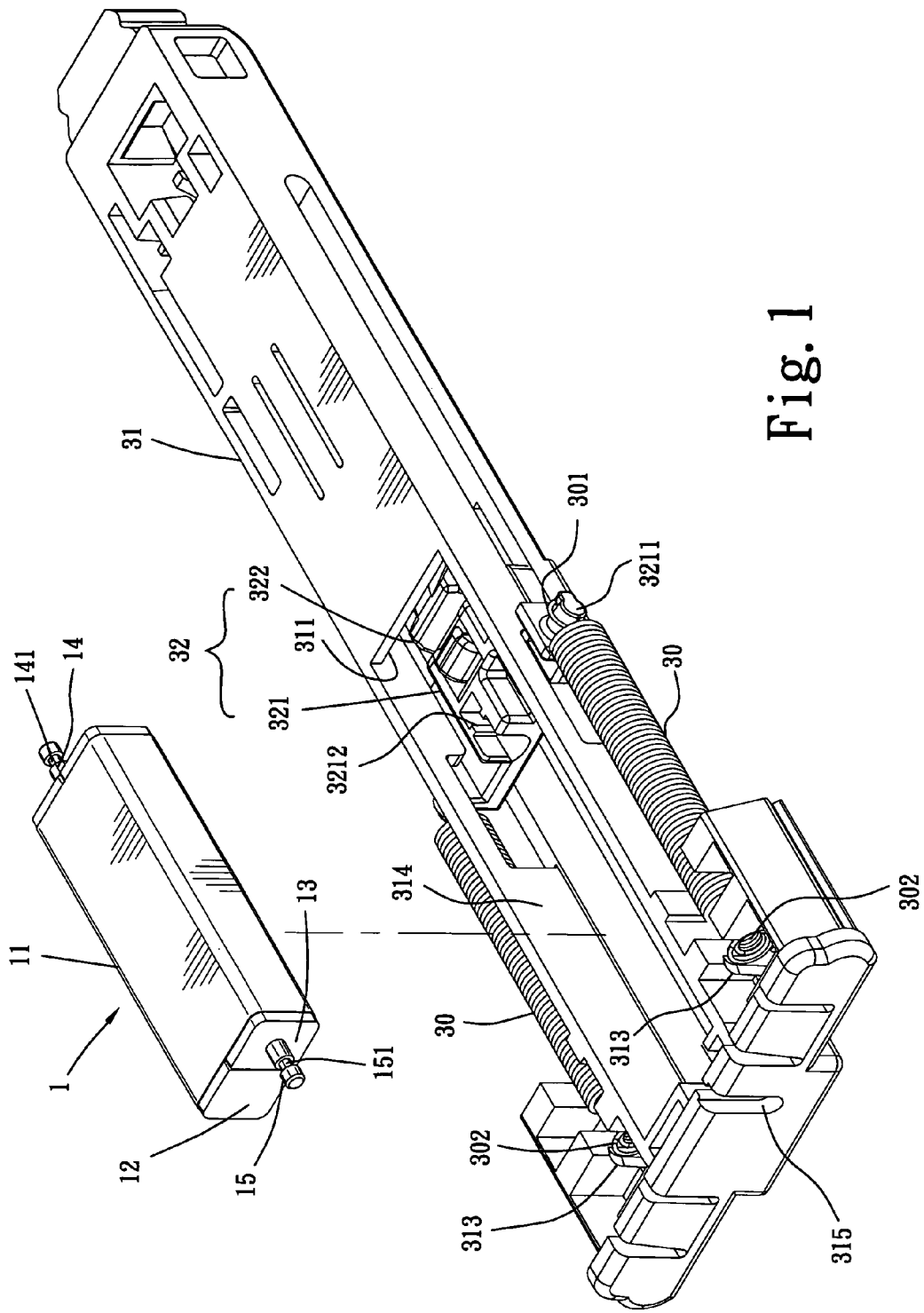
FIG. 1 is an exploded view showing the relationship between a biaxial flow damper and an auto-close mechanism according to the present invention.

Referring to FIGS. 1-8, a biaxial flow damper 1 is shown used in an auto-close mechanism in a sliding rail assembly for drawer. The auto-close mechanism comprises two spring members 30, a holder base 31, a sliding block set 32, and a link 33.

The holder base 31 is affixed to the rear side of the outer sliding rail 21 of the sliding rail assembly (see FIG. 6) in a cabinet or server frame (not shown), comprising a longitudinal sliding slot 311, a locating recess 312 disposed at the front side of the sliding slot 311 (see FIG. 8), an accommodation chamber 314 disposed near the rear side in communication and longitudinal alignment with the longitudinal sliding slot 311 for accommodating the biaxial flow damper 1, and two rear locating rods 313 disposed at two sides relative to the accommodation chamber near the rear side of the holder base 31.

The sliding block set 32 (see FIGS. 1 and 8) comprises a slide 321 longitudinally slidably accommodated in the sliding slot 311 of the holder base 31, and a swivel hook 322. coupled to the front side of the slide 321. The slide 321 has two locating rods 3211 disposed at its two opposite lateral sides, and a rear mounting groove 3212 connected to the biaxial flow damper 1. The swivel hook 322 has a coupling portion 3221 for detachably coupling to the link 33, and a hooked portion 3222 (see FIG. 8) for hooking in the locating recess 312 of the holder base 31.

The spring members 30 each have a front end 301 respectively fastened to the locating rods 3211 of the slide 321 of the sliding block set 32, and a rear end 302 respectively fastened to the locating rods 313 of the holder base 31.

The link 33 (see FIG. 6) is affixed to the inner sliding rail 22 of the aforesaid sliding rail assembly, comprising a connection portion 331 for the coupling of the coupling portion 3221 of the swivel hook 322.

When the inner sliding rail 22 is moved with the carrier, for example, drawer (not shown) backwards, one side 332 of the link 33 is stopped against the coupling portion 3221 of the swivel hook 322 of the sliding block set 32, causing the swivel hook 322 to bias. When the swivel hook 322 is forced to bias, it disengages the hooked portion 3222 from the locating recess 312 of the holder base 31 and forces the coupling portion 3221 into connection with the connection portion 331 of the link 33, for enabling the spring members 30 to return (pull back) the slide 321 of the sliding block set 32 and the connected swivel hook 322 as well as the inner sliding rail 22 and the carrier (drawer), achieving the auto-close effect (see also FIG. 7). When the spring members 30 return (pull back) the slide 321 of the sliding block set 32, the biaxial flow damper 1 buffers the return stroke of the slide 321.

Referring to FIGS. 1 and 2 again, the accommodation chamber 314 of the holder base 31 accommodates the biaxial flow damper 1 that has a cylinder body 11 and two piston rods 14 and 15 respectively extending out of the front and rear sides of the cylinder body 11. The cylinder body 11 of the biaxial flow damper 1 is movable in the accommodation chamber 314. The front piston rod 14 has a neck 141 coupled to a rear mounting groove 3212 of the slide 321 of the sliding block set 32. The rear piston rod 15 has a neck 151 coupled to a rear coupling hole 315 of the holder base 31. During backward stroke of the slide 321 of the sliding block set 32 subject to the spring power of the spring members 30, the hydraulic fluid resistance produced upon retraction of the front piston 14 into the cylinder body 11 and the hydraulic fluid resistance produced upon retraction of the rear piston 15 into the cylinder body 11 smoothen the speed of the return stroke of the slide 321 of the sliding block set 32, and therefore the speed of the return stroke of the inner sliding rail 22 and the carrier (drawer) is buffered, preventing vibration and noises and prolonging the lifetime of the related parts. By means of the arrangement of the front and rear piston rods 14 and 15 in the cylinder body 11, the biaxial flow damper 1 requires less installation space while providing a relatively longer buffer stroke to achieve a relatively better buffer performance.

Figure 16:
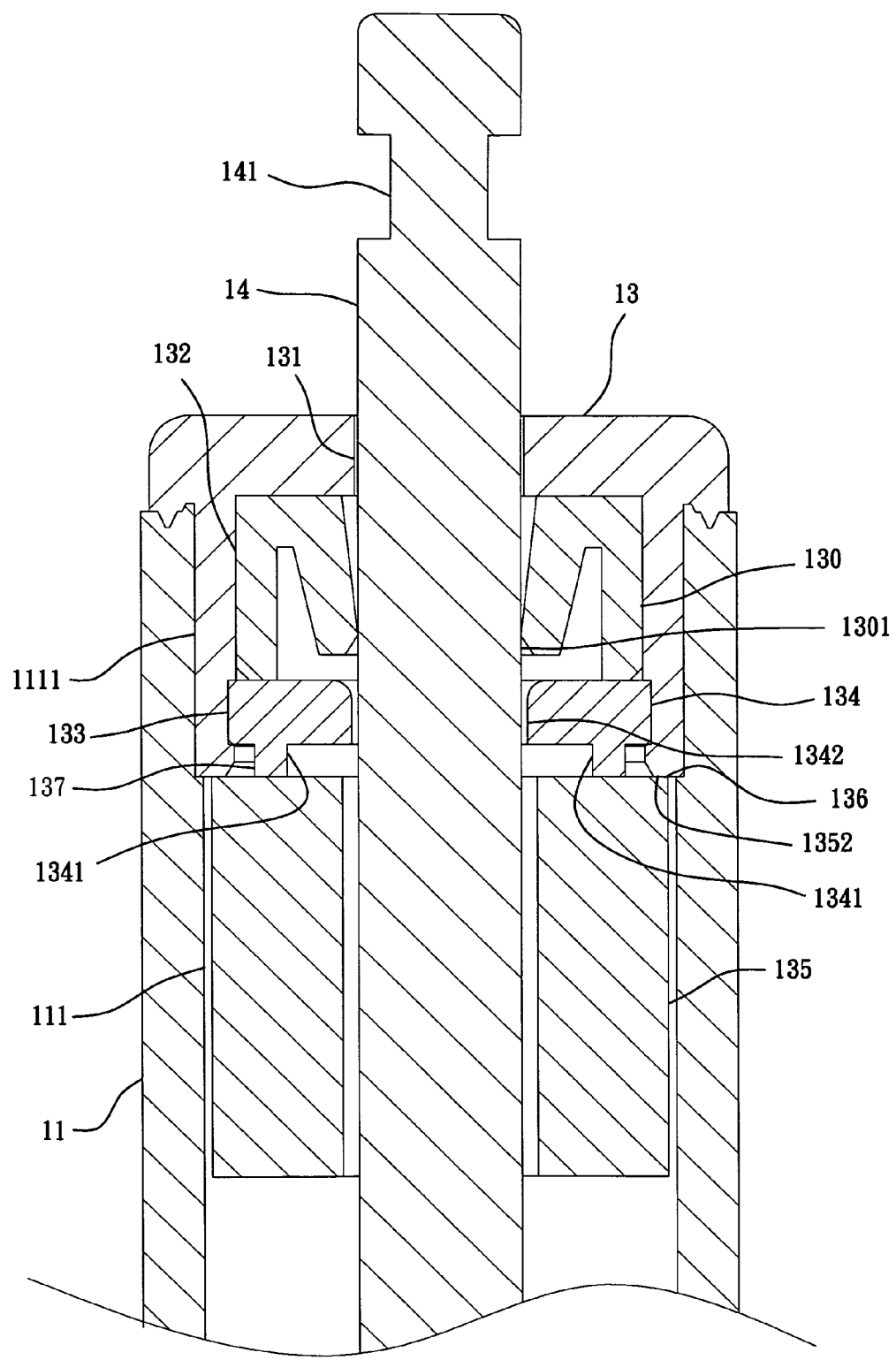
FIG. 16 is a sectional view in an enlarged scale of a part of the biaxial flow damper in accordance with the first embodiment of the present invention.

Referring to FIGS. 9 and 16, the aforesaid biaxial flow damper 1 is a biaxial hydraulic cylinder comprising a cylinder body 11, two first end caps 12, two second end caps 13, a first (front) piston rod 14, a second (rear) piston rod 15, two stop members 4, two pistons 5, and two valve blocks 6.

The cylinder body 11 comprises two hydraulic fluid chambers 111 arranged in parallel. The two hydraulic fluid chambers 111 accommodate the pistons 5 respectively, for enabling the pistons 5 to be respectively moved forwards/backwards in the hydraulic fluid chambers 111 by the first piston rod 14 and the second piston rod 15 in reversed directions. Each hydraulic fluid chamber 111 had a first open end 1111 and a second open end 1112.

The two first end caps 12 are respectively bonded to the front and rear sides of the cylinder body 11 by, for example, an ultrasonic heat-sealing process, to block the first open end 1111 of one hydraulic fluid chamber 111 and the second open end 1112 of the other hydraulic fluid chamber 111.

Figure 1A:
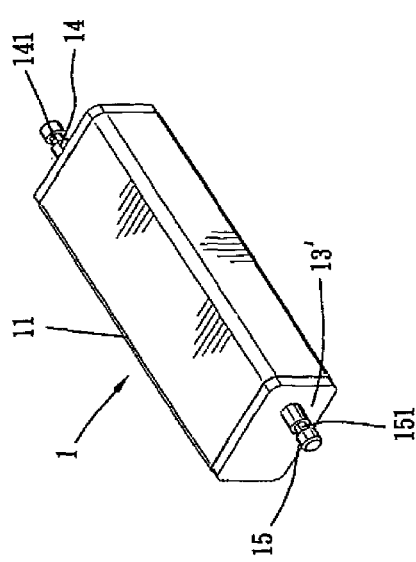
FIG. 1a is a perspective view of a biaxial flow damper according to an alternative embodiment having integrally formed end caps.
Figure 2:
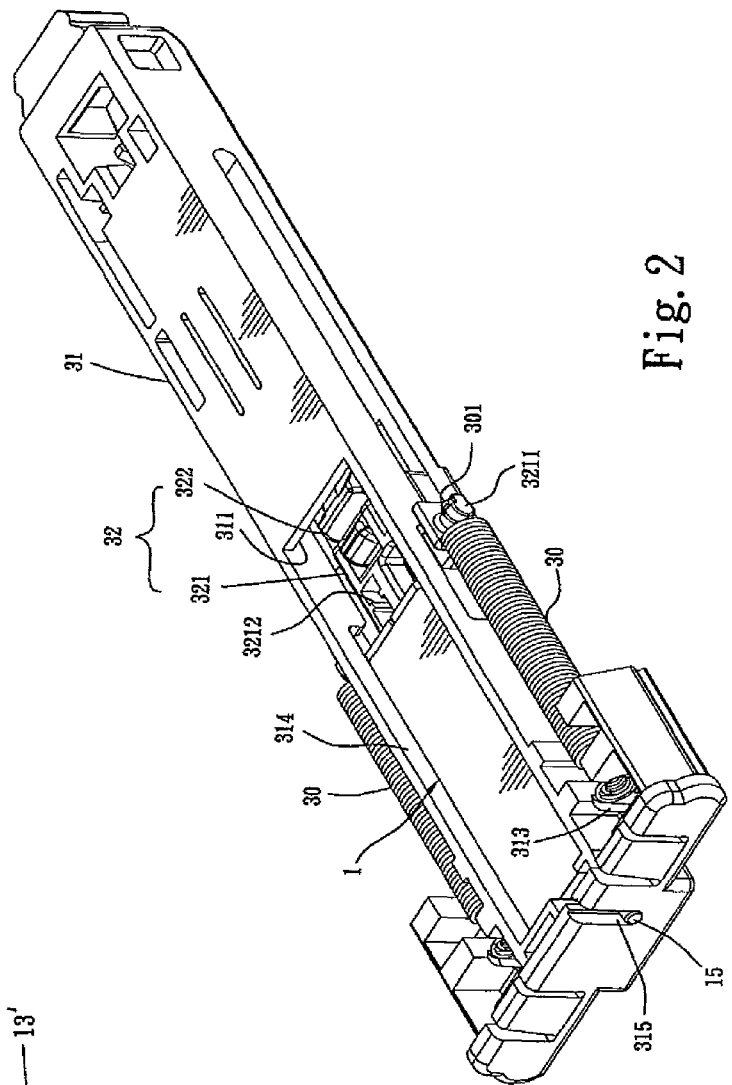
FIG. 2 is an oblique bottom elevation of the assembly of FIG. 1.
Figure 3:
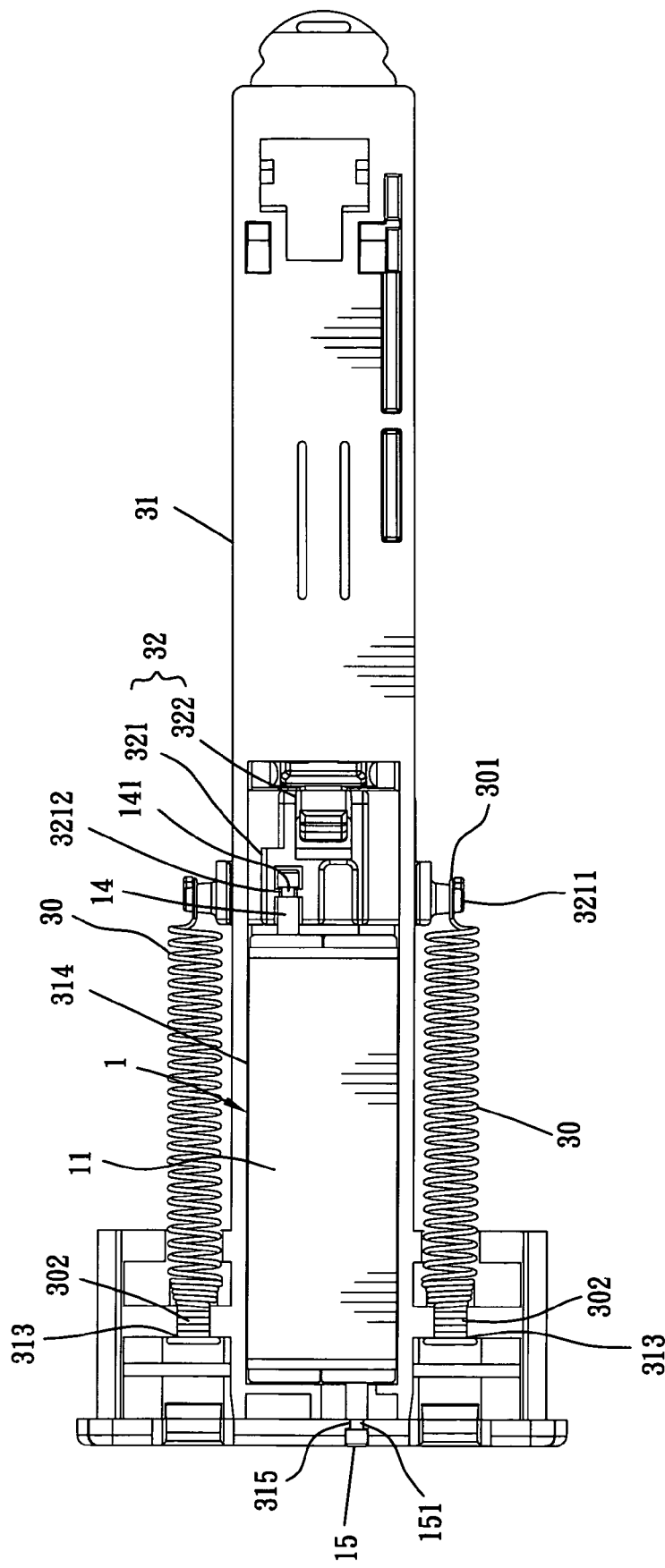
FIG. 3 is a top plain view of FIG. 2.
Figure 4:
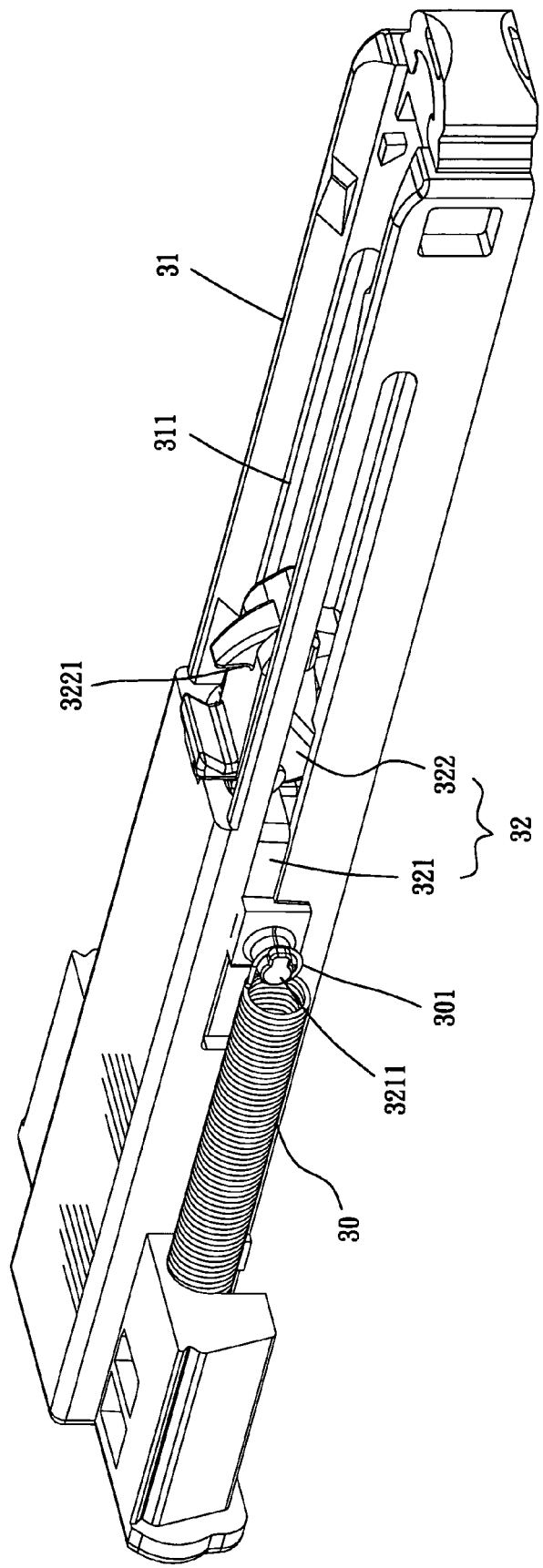
FIG. 4 is an oblique front elevation of the assembly of FIG. 1.
Figure 5:
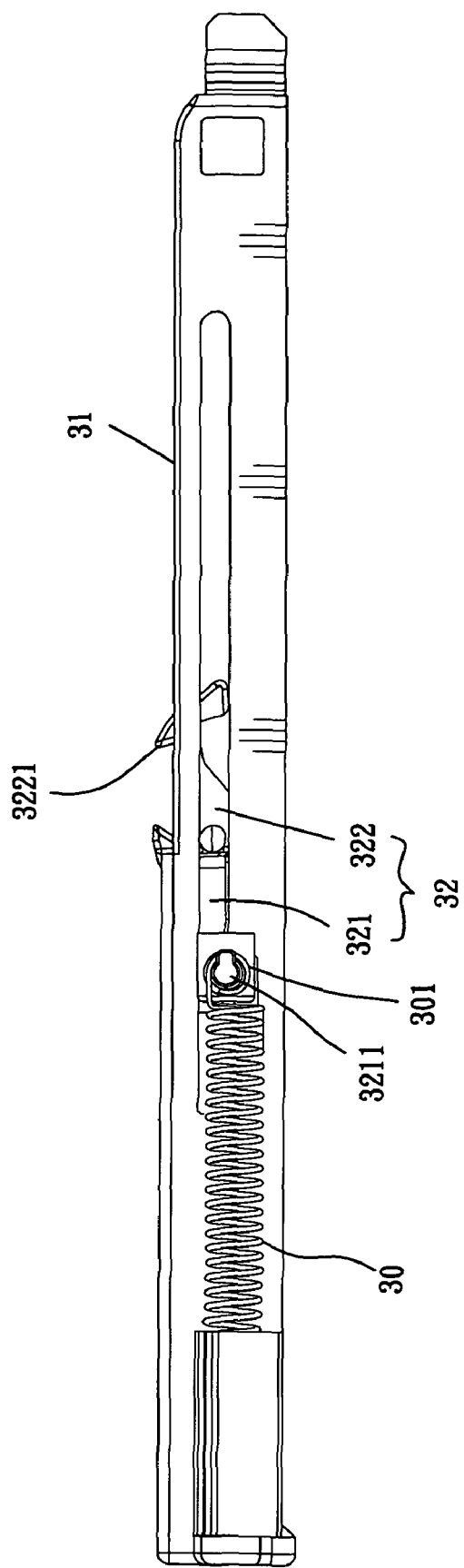
FIG. 5 is a side plain view of FIG. 4.
Figure 6:
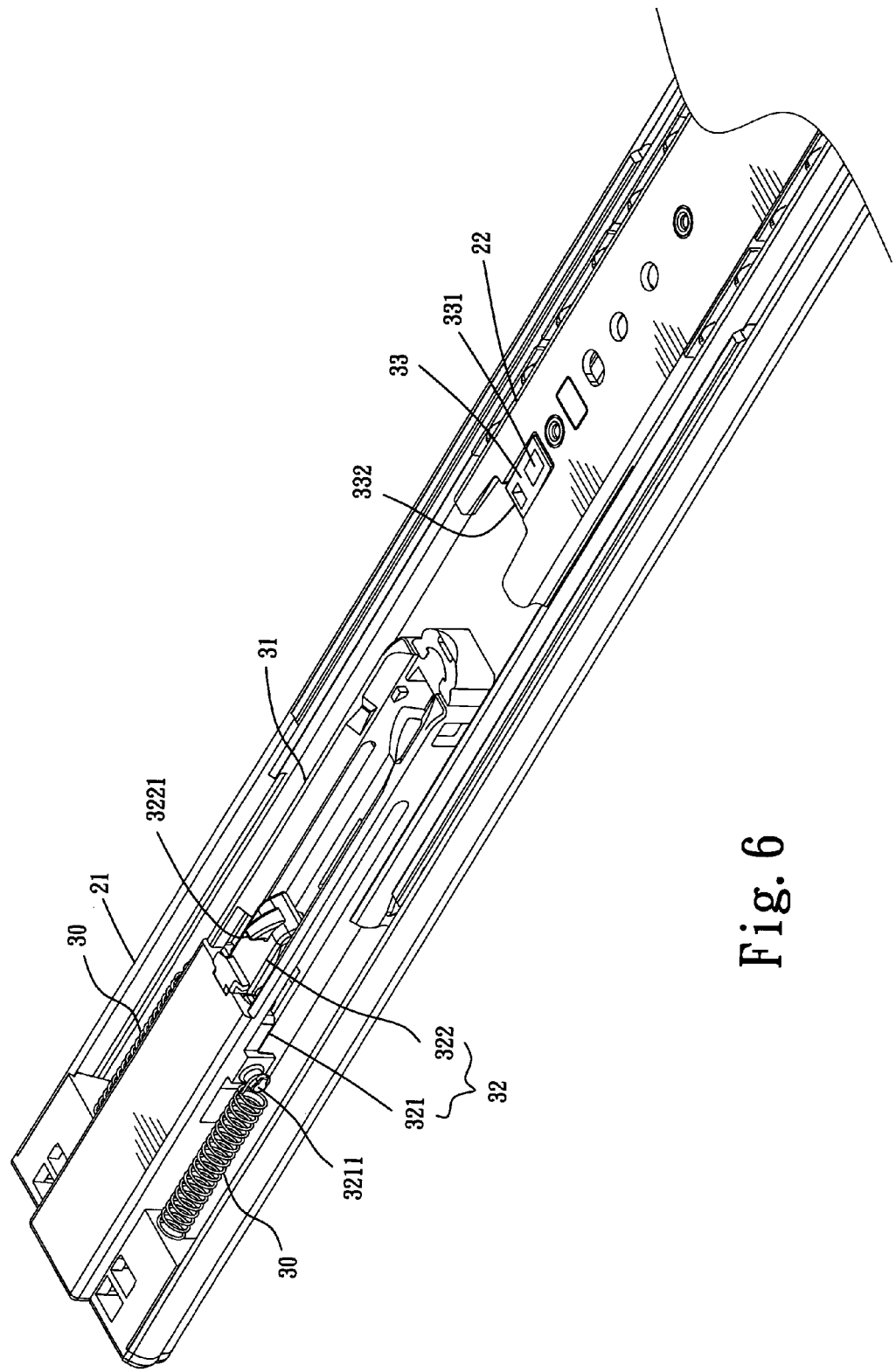
FIG. 6 illustrates the assembly of FIG. 1 installed in a sliding rail assembly for drawer according to the present invention.
Figure 7:
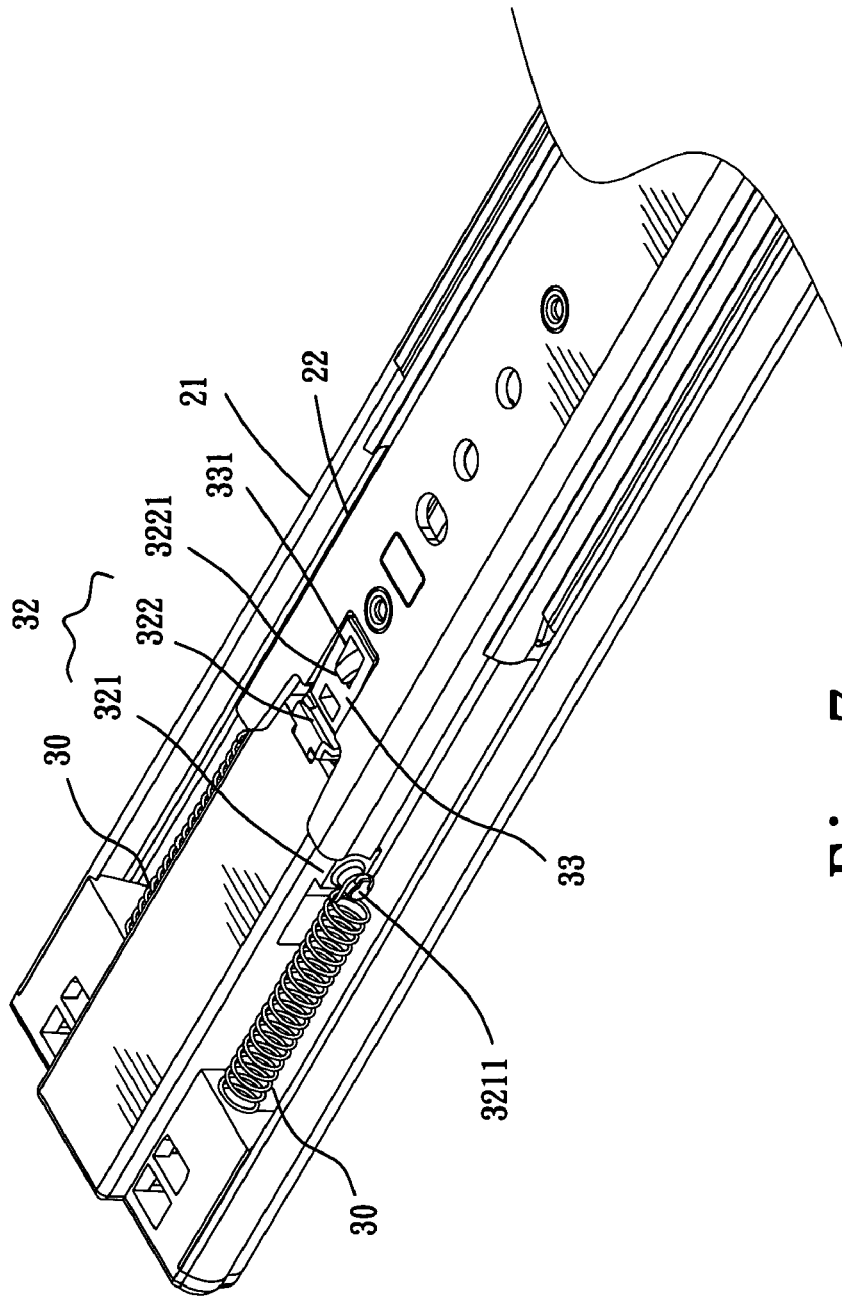
FIG. 7 corresponds to FIG. 6 showing the status of the auto-close mechanism after a return stroke of the inner sliding rail.
Figure 8:
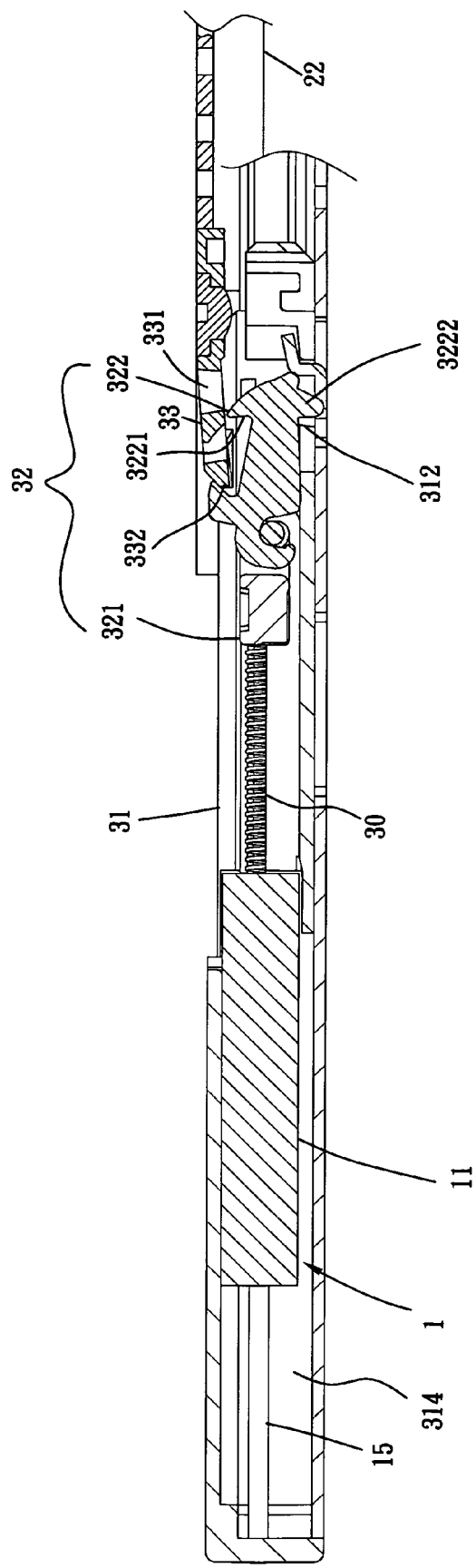
FIG. 8 is a schematic sectional view showing the retaining portion of the swivel hook secured to the locating recess of the holder base of the auto-close mechanism according to the present invention.
Figure 11:
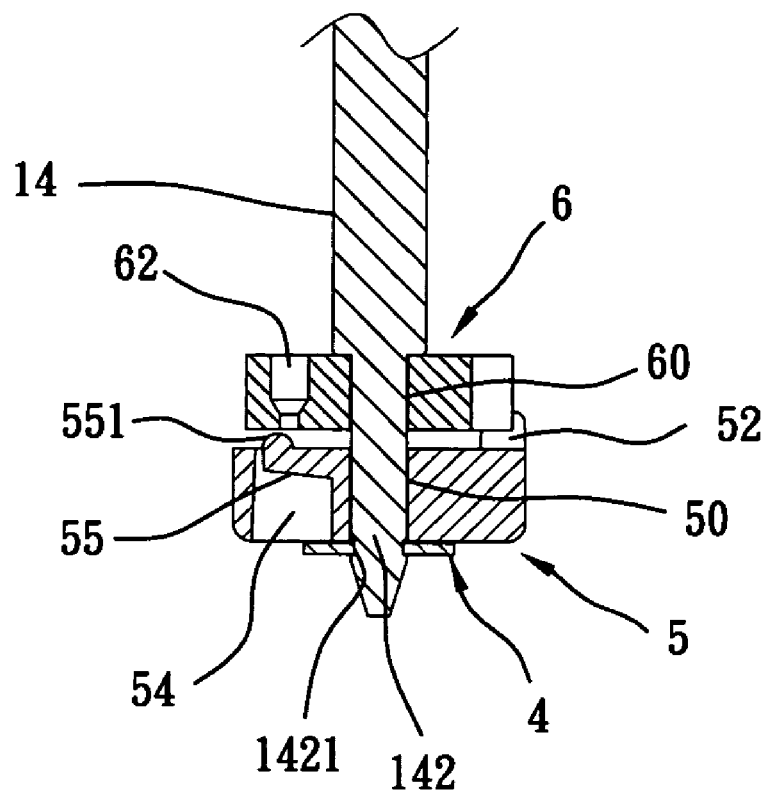
FIG. 11 is a sectional view in an enlarged view of a part of the first embodiment of the present invention, showing the arrangement of the piston and the valve block at the front piston rod.
Figures 12, 13:
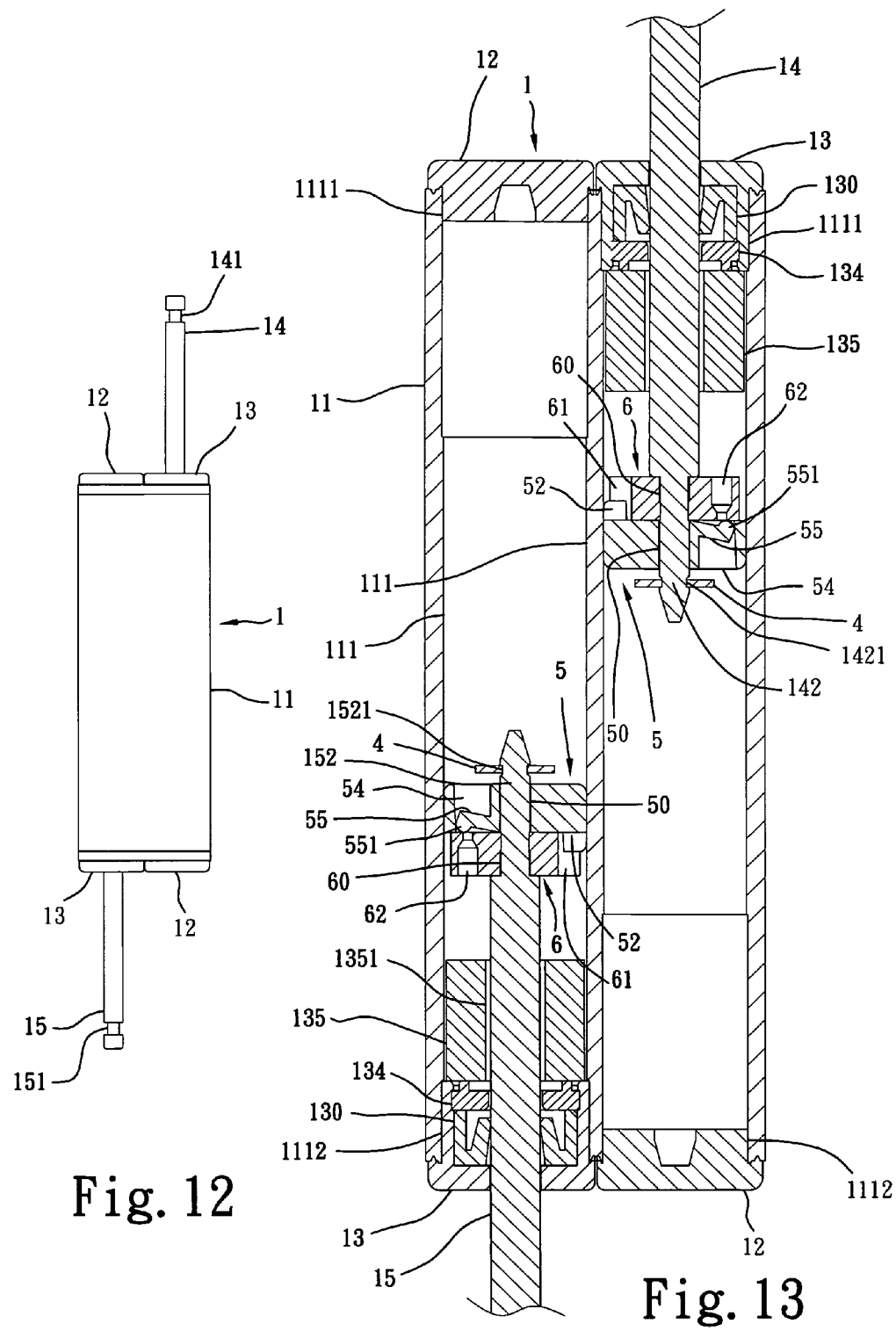
FIG. 12 is similar to FIG. 9 but showing the piston rods extended out of the cylinder body.
FIG. 13 is a longitudinal view in section in an enlarged scale of FIG. 12.
Figure 14:
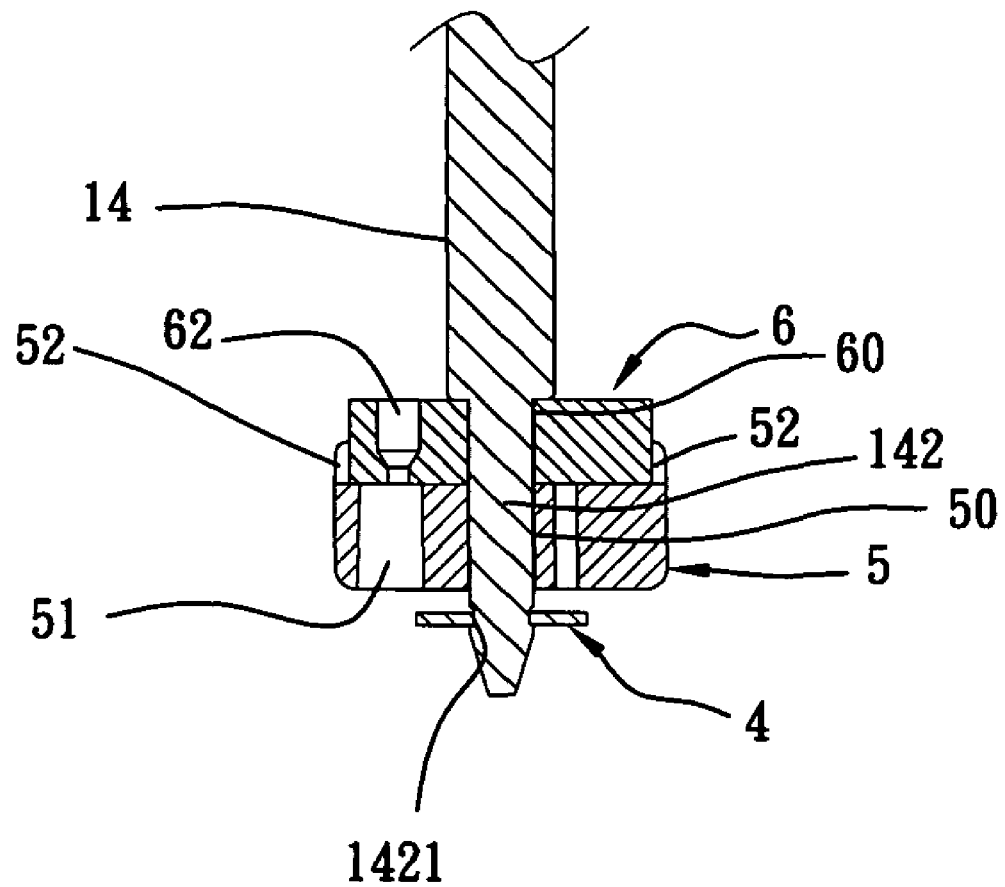
FIG. 14 corresponds to FIG. 11, showing the piston and the valve block abutted against each other.

The two second end caps 13 are respectively bonded to the front and rear sides of the cylinder body 1 by, for example, an ultrasonic heat-sealing process, to block the first open end 111 of one hydraulic fluid chamber 111 and the second open end 1112 of the other hydraulic fluid chamber 111. Each second end cap 13 has an axle hole 131 for the passing of the piston rod 14 or 15. The two second end caps 13 may be respectively integrally molded with the two first end caps 12 from a plastic material, shown alternatively as end caps 13' in FIG. 1a.

The first piston rod 14 and the second piston rod 15 are respectively inserted through the axle holes 131 of the second end caps 13, each having a reduced rear extension rod 142 or 152 respectively axially extending from the respective rear end and suspending inside the hydraulic fluid chambers 111 of the cylinder body 11 and a respective front end ending out of the front or rear side of the cylinder body 11 and provided with a neck 141 or 151. The reduced rear extension rod 142 or 152 has a mounting groove 1421 or 1521 extending around the periphery.

The stop members 4 are respectively fastened to the mounting grooves 1421 and 1521 of the reduced rear extension rods 142 and 152 of the first and second piston rods 14 and 15.

Figure 15:
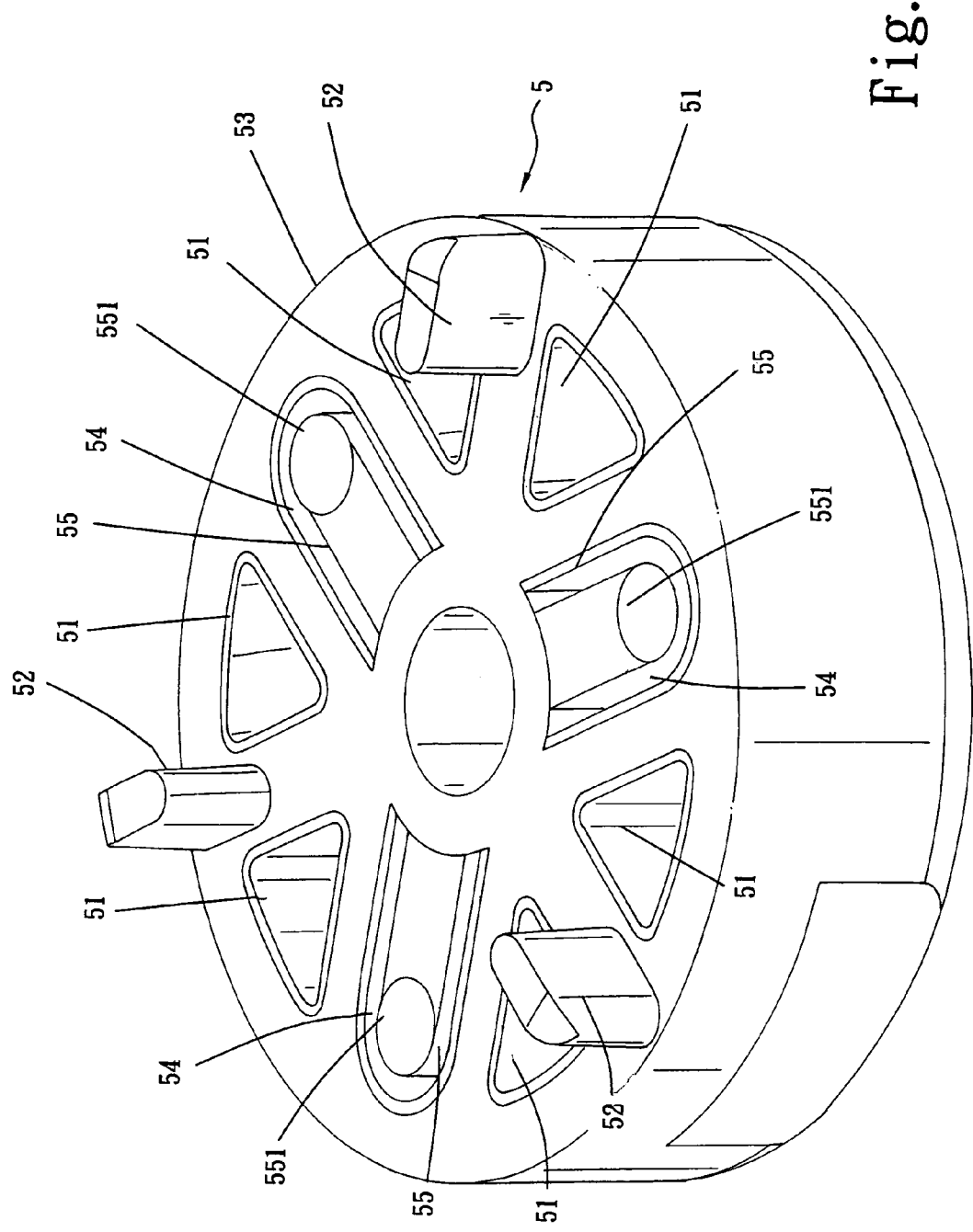
FIG. 15 is an enlarged perspective view of one piston of the biaxial flow damper in accordance with the first embodiment of the present invention.

The pistons 5 are respectively slidably coupled to the reduced rear extension rods 142 and 152 of the first and second piston rods 14 and 15 in the hydraulic fluid chambers 111 of the cylinder body 11 between the valve blocks 6 and the stop members 4, each having a center axle hole 50, which receives the reduced rear extension rod 142 or 152 of the associating piston rod 14 or 15, a plurality of axial through holes 51 (see FIG. 15), a plurality of guide blocks 52 protruded from the rear side, at least one notch 54 (see FIGS. 10 and 15) respectively defining an elastic thing wall portion 55, which has an outer protrusion 551.

The valve blocks 6 having grooves 60 are respectively slidably coupled to the reduced rear extension rods 142 and 152 of the first and second piston rods 14 and 15 in the hydraulic fluid chambers 111 of the cylinder body 11, each having an outer diameter smaller than the inner diameter of the associating hydraulic fluid chamber 111, a plurality of guide grooves 61 for receiving the guide blocks 52 of the associating piston 5 to prohibit rotation of the associating piston 5 while allowing the associating piston 5 to move axially, and a plurality of axially extending through holes 62 for aiming at some through holes 51 of the associating piston 5 respectively.

Referring to FIGS. 9-14, when the first piston rod 14 and the second piston rod 15 are respectively extending out of the front and rear sides of the cylinder body 11, the pistons 5 are respectively moved by the hydraulic fluid in the respective hydraulic fluid chambers 111 toward the associating stop members 4 by means of the guidance of the guide blocks 52 in the respective guide grooves 61. When the pistons 5 are respectively stopped at the stop members 4, the outer protrusions 551 of the thing wall portions 55 of the pistons 5 are stopped against the associating valve blocks 6 to keep the pistons 5 away from the associating valve blocks 6 at a distance so that the hydraulic fluid flows through the through holes 62 of the valve blocks 6 and the gap between the respective valve blocks 6 and the respective pistons 5 and the through holes 51 of the respective pistons 5, and therefore the piston rods 14 and 15 can be extended out of the cylinder body 11 rapidly. On the contrary, when the first piston rod 14 and the second piston rod 15 are respectively moving toward the inside of the cylinder body 11, the pistons 5 are respectively forced by the hydraulic fluid in the respective hydraulic fluid chambers 111 toward the associating valve blocks 6, and the outer protrusions 551 of the thing wall portions 55 of the pistons 5 are respectively forced into the notches 54 of the pistons 5 (see FIGS. 13 and 14), i.e., the valve blocks 6 and the pistons 5 are moved with the respective piston rods 14 and 15 against the hydraulic fluid to buffer the movement of the piston rods 14 and 15, and therefore the piston rods 14 and 15 are moved backwards to the inside of the cylinder body 11 at a slow speed. After the piston rods 14 and 15 have been received in the respective hydraulic fluid chambers 111, the thing wall portions 55 of the pistons 5 immediately return to their former shape due to the effect of their springy material property, thereby keeping the pistons 5 away from the valve block 6 at a distance for further quick outward movement of the piston rods 14 and 15.

Referring to FIG. 16, each second end cap 13 has a first inside annular groove 132 disposed in communication with its the axle hole 131 for the mounting of a seal ring 130 that defines therein a center hole 1301. By means of the center hole 1301, the seal ring 130 is kept is a watertight contact with the periphery of the piston rod 14 or 15. Each second end cap 13 further has a second inside annular groove 133 for the mounting of a locating block 134. The second inside annular groove 133 has a diameter relatively greater than the first inside annular groove 132. The locating block 134 is molded from a hard plastic material, having a positioning flange 1341 stopped at an end edge 137 of the associating second end cap 13 and a center axle hole 1342 for the passing of the piston rod 14 or 15 (see FIG. 16).

Further, two cushion blocks 135 are respectively mounted on the piston rods 14 and 15 in the hydraulic fluid chambers 111 of the cylinder body 11. Each cushion block 135 has an outer side 1352 stopped at the inner side 136 of the associating second end cap 13, and a center axle hole 1351 for the passing of the piston rod 14 or 15. The cushion blocks 135 can be molded from foamed plastics or rubber. When the piston rods 14 and 15 are respectively extended out of the cylinder body 11 rapidly, the valve blocks 6 will be forced against the cushion blocks 135, causing the cushion blocks 135 to deform, thereby absorbing shocks.

In the aforesaid embodiment, a hydraulic fluid is filled in the hydraulic fluid chambers 111. Alternatively, air can be used to substitute for the hydraulic fluid. Further, the aforesaid first end caps 12 can be eliminated, and the cylinder body 11 is provided with only one first open end 1111 in communication with one hydraulic fluid chamber 111 and one second open end 1112 in communication with the other hydraulic fluid chamber 111 for the passing of the piston rods 14 and 15 respectively.

Figure 17:
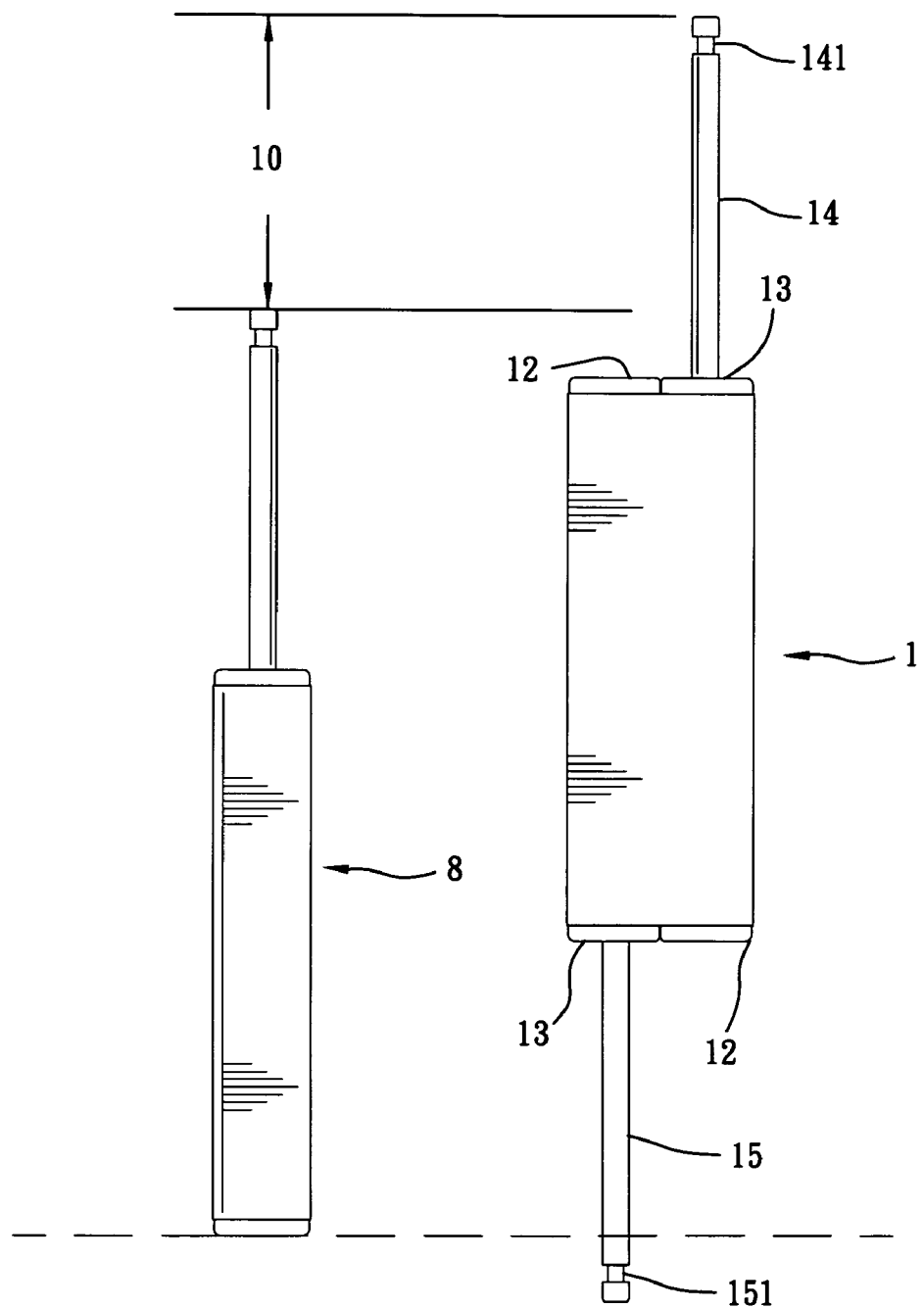
FIG. 17 is a schematic drawing showing the buffer stroke of a conventional monoaxial flow damper and the buffer stroke of the biaxial flow damper in accordance with the first embodiment of the present invention.

Referring to FIG. 17, when compared with a conventional monoaxial flow damper 8, the biaxial flow damper 1 of the present invention provides an extra buffer stroke 10.

Figure 18:
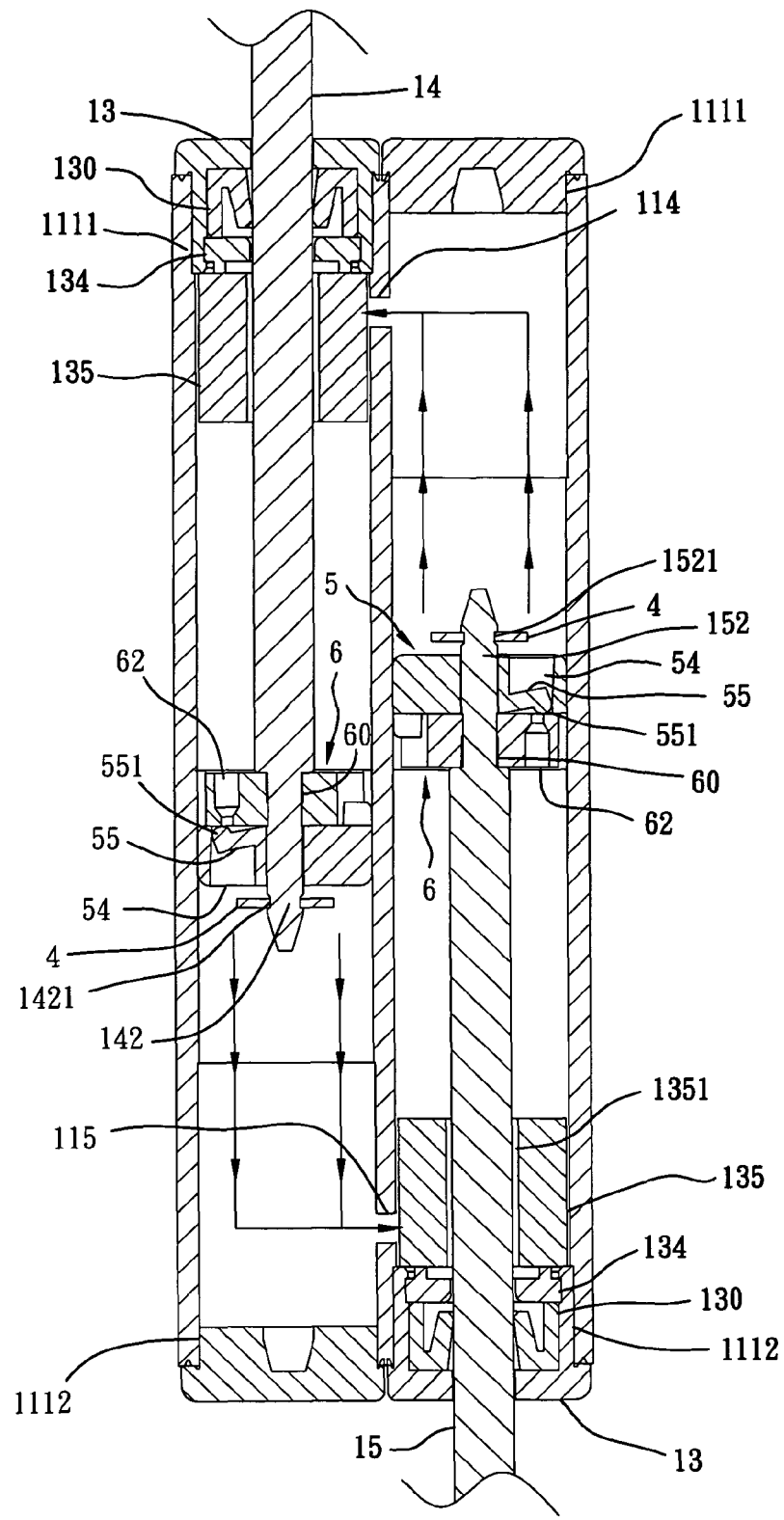
FIG. 18 is a sectional view of a biaxial flow damper in accordance with a second embodiment of the present invention.
Figure 19:
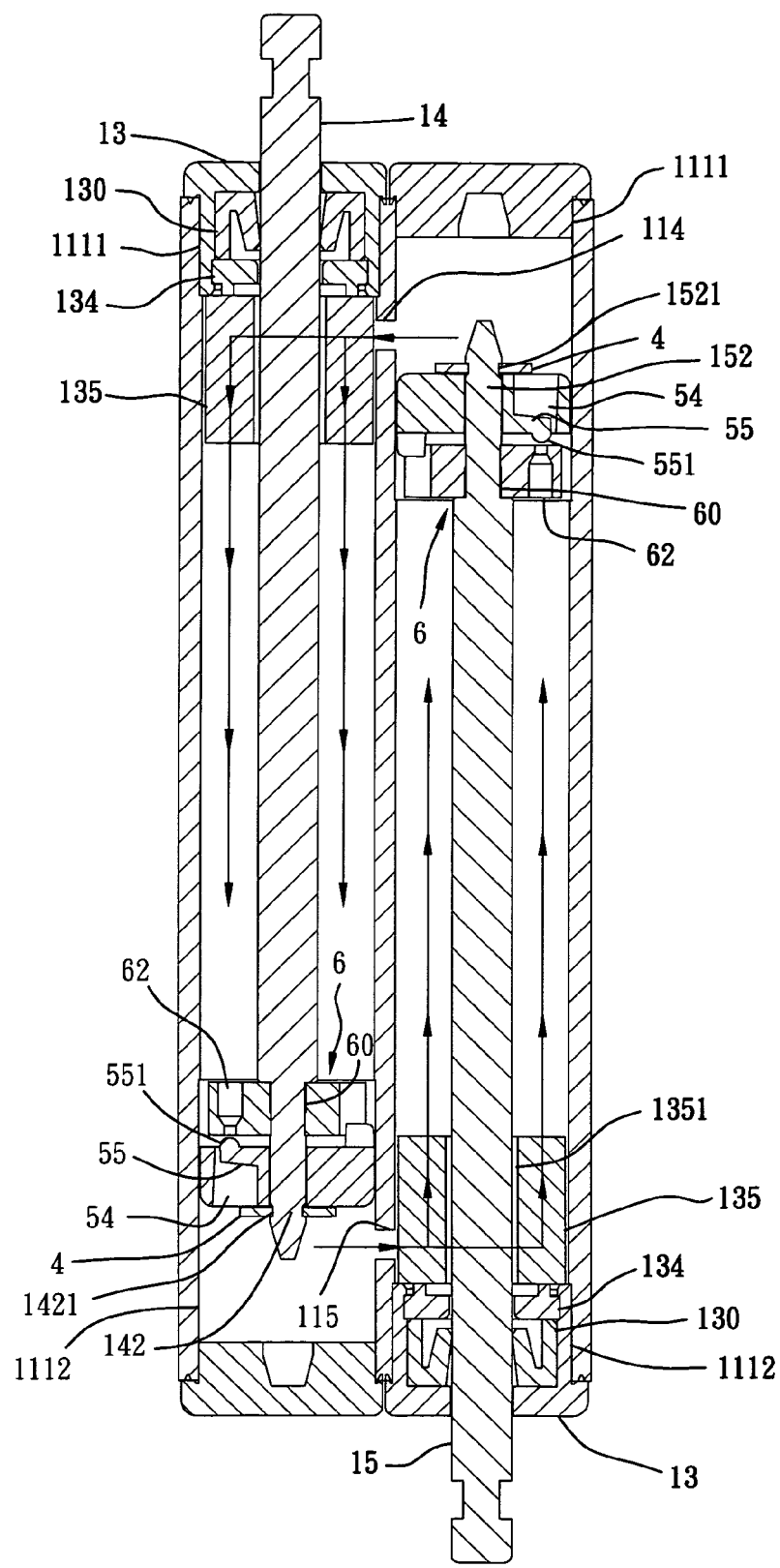
FIG. 19 corresponds to FIG. 18, showing the two piston rods returned to the inside of the cylinder body.

FIGS. 18 and 19 show a biaxial flow damper in accordance with a second embodiment of the present invention. This second embodiment is substantially similar to the aforesaid first embodiment with the exception that the cylinder body 11 has a front connection hole 114 and a rear connection hole 115 respectively transversely disposed near the front and rear sides in communication between the hydraulic fluid chambers 111. During forward or backward movement of the piston rods 14 and 15, the pistons 5 and the valve blocks 6 are moved to force the hydraulic fluid between the hydraulic fluid chambers 111 (see FIGS. 18 and 19). This second embodiment achieves the same buffer effect.

Figure 20:
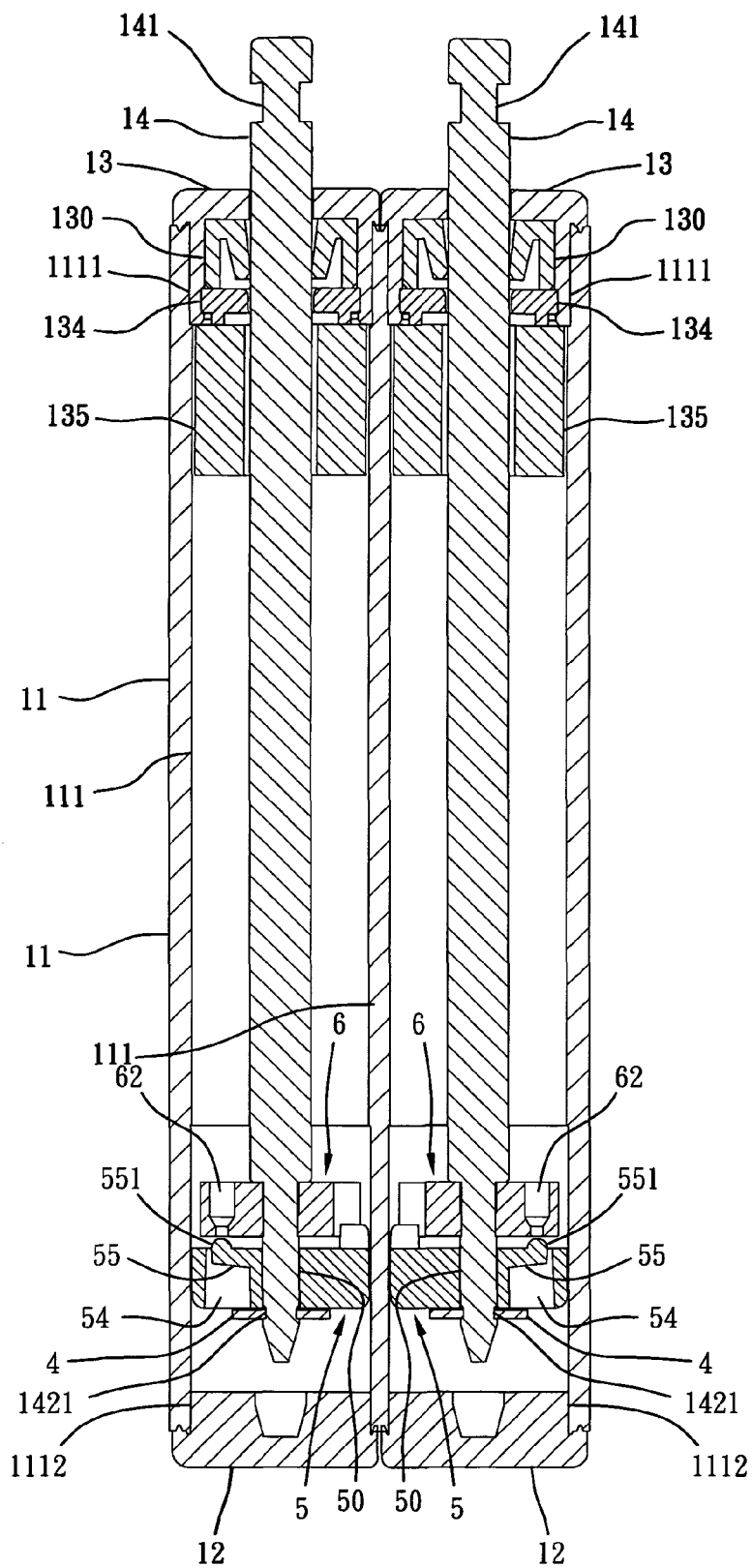
FIG. 20 is a sectional view of a biaxial flow damper in accordance with a third embodiment of the present invention.

FIG. 20 shows a biaxial flow damper in accordance with a third embodiment of the present invention. According to this third embodiment, the two piston rods 14 and 15 are arranged in parallel and extend out of the same side of the cylinder body 11. This embodiment does not increase the buffer stroke, however, it enhances the buffer effect.

As stated above, the invention provides a biaxial flow damper for drawer that has the following features and advantages:

1. The cylinder body 11 has two hydraulic fluid chambers 111 and two piston rods 14 and 15 respectively slidably mounted in the hydraulic fluid chambers 111 to provide an enhanced buffer effect.

2. The biaxial flow damper does not require much installation space while providing an enhanced buffer effect, and therefore it is practical for use in the sliding rail assembly of a drawer, server, or any of a variety of furniture.

What is claimed is:

1. A biaxial flow damper used in an auto-close mechanism of a sliding rail assembly, comprising:
    a cylinder body, said cylinder body comprising a front side, a rear side, and two flow chambers reversely arranged in parallel between said front side and said rear side;
    two first end caps respectively mounted in the front and rear sides of said cylinder body to close one end of each of said flow chambers;
    two second end caps respectively mounted in the front and rear sides of said cylinder body to close an opposite end of each of said flow chambers, and wherein there is no means for fluid communication between the flow chambers;
    two pistons respectively slidably mounted in said flow chambers of said cylinder body;
    two piston rods respectively connected to said pistons and respectively extending out of said second end caps at the front and rear sides of said cylinder body; and
    two valve blocks respectively mounted on said piston rods adjacent to said pistons, said valve blocks each having a plurality of guide grooves for guiding axial movement of said pistons.

2. The biaxial flow damper as claimed in claim 1, wherein said flow chambers of said cylinder body are respectively filled with a flow substance.

3. The biaxial flow damper as claimed in claim 2, wherein said second end caps each have an axle hole for the passing of said piston rods respectively.

4. The biaxial flow damper as claimed in claim 1, wherein said second end caps are independent members respectively bonded to the front and rear sides of said cylinder body.

5. The biaxial flow damper as claimed in claim 1, wherein said first end caps are independent members respectively bonded to the front and rear sides of said cylinder body.

6. The biaxial flow damper as claimed in claim 1, wherein one of said second end caps is formed integral with one of said first end caps.

7. The biaxial flow damper as claimed in claim 1, wherein said pistons each have an outer diameter smaller than the diameter of the associating flow chamber of said cylinder body.

8. The biaxial flow damper as claimed in claim 7, wherein said pistons each have at least one notch defining a respective elastic thin wall portion, said elastic thin wall portion each having a protrusion.

9. The biaxial flow damper as claimed in claim 1, wherein said pistons each have a plurality of axially extending through holes.

10. The biaxial flow damper as claimed in claim 1, wherein said pistons each have a plurality of guide blocks for guiding axial movement of the respective pistons in the associating flow chambers.

11. The biaxial flow damper as claimed in claim 1, further comprising two stop members respectively affixed to said piston rods inside said flow chambers for stopping said pistons at said piston rods.

12. The biaxial flow damper as claimed in claim 1, wherein said valve blocks each further have a plurality of axial through holes.

13. The biaxial flow damper as claimed in claim 1, further comprising a flow substance that is a hydraulic fluid or air.

14. The biaxial flow damper as claimed in claim 1, wherein said two piston rods each have an outer end disposed outside said cylinder body and a neck at said outer end.

15. A biaxial flow damper used in an auto-close mechanism of a sliding rail assembly, comprising:
- a cylinder body, said cylinder body comprising a front side, a rear side, and two flow chambers reversely arranged in parallel between said front side and said rear side;
- two first end caps respectively mounted in the front and rear sides of said cylinder body to close one end of each of said flow chambers;
- two second end caps respectively mounted in the front and rear sides of said cylinder body to close an opposite end of each of said flow chambers, and wherein there is no means for fluid communication between the flow chambers;
- two pistons respectively slidably mounted in said flow chambers of said cylinder body;
- two piston rods respectively connected to said pistons and respectively extending out of said second end caps at the front and rear sides of said cylinder body;
- said pistons each have an outer diameter smaller than the diameter of the associating flow chamber of said cylinder body; and
- wherein said pistons each have at least one notch defining a respective elastic thin wall portion, said elastic thin wall portion each having a protrusion.

16. The biaxial flow damper as claimed in claim 15, wherein said flow chambers of said cylinder body are respectively filled with a flow substance.

17. The biaxial flow damper as claimed in claim 16, wherein said second end caps each have an axle hole for the passing of said piston rods respectively.

18. The biaxial flow damper as claimed in claim 15, wherein said second end caps are independent members respectively bonded to the front and rear sides of said cylinder body.

19. The biaxial flow damper as claimed in claim 15, wherein said first end caps are independent members respectively bonded to the front and rear sides of said cylinder body.

20. The biaxial flow damper as claimed in claim 15, wherein one of said second end caps is formed integral with one of said first end caps.

21. The biaxial flow damper as claimed in claim 15, wherein said pistons each have a plurality of axially extending through holes.

22. The biaxial flow damper as claimed in claim 15, wherein said pistons each have a plurality of guide blocks for guiding axial movement of the respective pistons in the associating flow chambers.

23. The biaxial flow damper as claimed in claim 15, further comprising two stop members respectively affixed to said piston rods inside said flow chambers for stopping said pistons at said piston rods.

24. The biaxial flow damper as claimed in claim 15, further comprising a flow substance that is a hydraulic fluid or air.

25. The biaxial flow damper as claimed in claim 15, wherein said two piston rods each have an outer end disposed outside said cylinder body and a neck at said outer end.

26. The biaxial flow damper as claimed in claim 15, further comprising two valve blocks respectively mounted on said piston rods adjacent to said pistons, said valve blocks each having a plurality of guide grooves for guiding axial movement of said pistons.

27. The biaxial flow damper as claimed in claim 26, wherein said valve blocks each further have a plurality of axial through holes.

* * * * *